July 14, 1931.    G. L. ROCK    1,813,958
APPARATUS FOR ROTATING ARTICLES
Filed Oct. 11, 1927
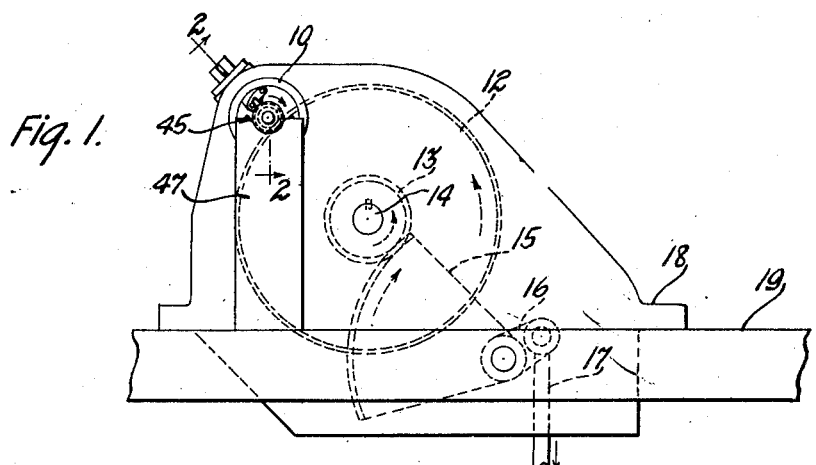
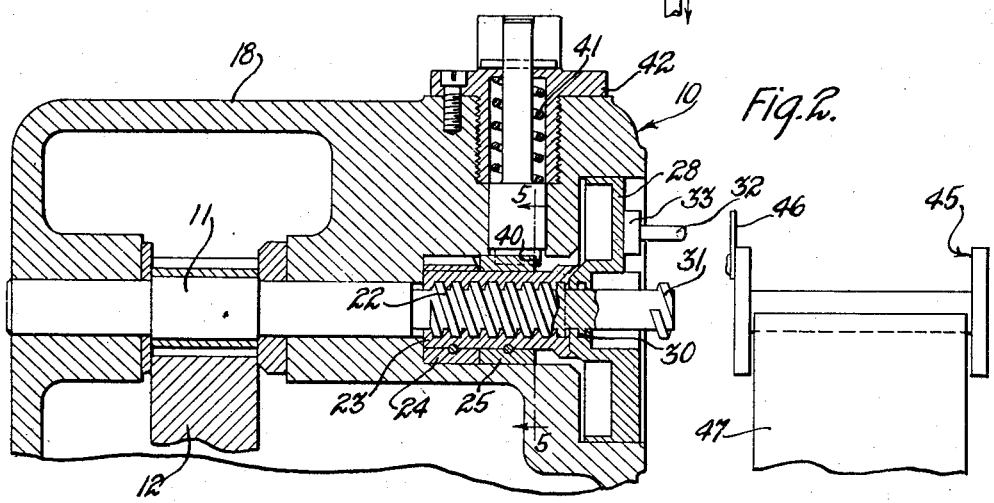
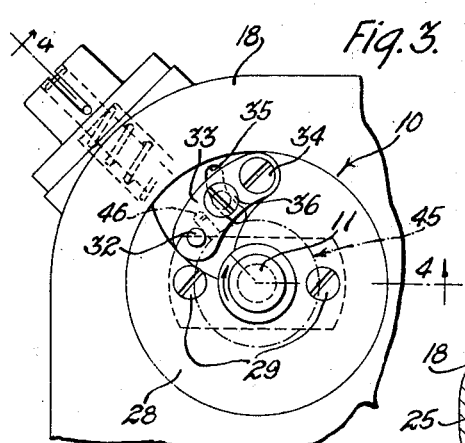
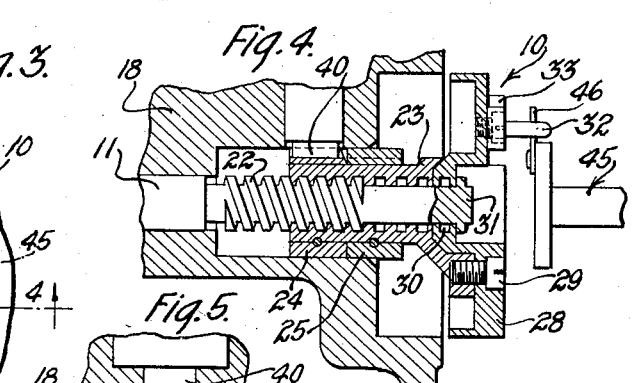
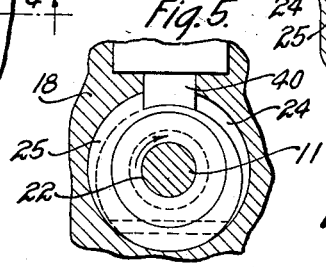
Inventor
George L. Rock
by H. A. Patterson Att'y.

Patented July 14, 1931

1,813,958

UNITED STATES PATENT OFFICE

GEORGE LYNDEN ROCK, OF CICERO, ILLINOIS, ASSIGNOR TO WESTERN ELECTRIC COMPANY, INCORPORATED, OF NEW YORK, N. Y., A CORPORATION OF NEW YORK

APPARATUS FOR ROTATING ARTICLES

Application filed October 11, 1927. Serial No. 225,582.

This invention relates to apparatus for rotating articles, and more particularly to a chuck for rotating spools.

The primary object of this invention is to provide a simple and efficient means for rotating articles and which may be expeditiously associated with and disassociated from the articles.

In accordance with the general features of the invention one embodiment thereof comprises a threaded shaft rotated in a ratchet controlled sleeve by an oscillatory gear segment. The sleeve is movable longitudinally of the shaft and causes an internally threaded driving member to engage and disengage a projecting terminal of a spool which is rotated when the internal threads of the member engage with a threaded portion of the forward end of the shaft.

Other advantages and features of the invention will become apparent in the following detailed description of one embodiment of the invention, reference being had to the accompanying drawings, wherein—

Fig. 1 is an end elevational view of a device representing one embodiment of the invention shown in association with an actuating mechanism;

Fig. 2 is an enlarged fragmentary sectional view of the device taken on line 2—2 of Fig. 1 disclosing the spool and its support in elevation;

Fig. 3 is an enlarged fragmentary detailed view of the upper part of the device shown in Fig. 1;

Fig. 4 is a fragmentary detailed sectional view taken on line 4—4 of Fig. 3, and Fig. 5 is an enlarged fragmentary view taken on line 5—5 of Fig. 2.

Referring now to the drawings wherein like numerals are employed to designate similar parts throughout the various figures, the number 10 indicates, generally, a spool rotating device including a shaft 11 geared to a gear 12 which in turn is driven by a gear 13 keyed to a common shaft 14. The gear 13 is driven by an oscillatory gear segment 15 attached through a link 16 to an actuating rod 17, and it will be clear that when the rod 17 is operated the segment will be oscillated to rotate the gear 13. Practically all of the above described mechanism may be enclosed within a housing 18 and fastened to a suitable work bench 19 as shown in Fig. 1.

The shaft 11 of the rotating device 10 is rotatably supported within the housing 18 and is provided with double threads 22 adapted to be rotated in and with an internally threaded sleeve 23. To this sleeve 23 is fastened a pair of ratchets 24 and 25 operatively rotatable in opposite directions from each other and a rotatable driving member 28 secured to the sleeve by screws 29. The driving member 28 is so mounted on the sleeve 23 that when the driving member 28 is advanced longitudinally of the shaft the internal thread 30 will not mesh with a thread 31 of the rotating shaft, but the ends thereof will abut to effect rotation of the driving member. The driving member 28 also carries a horizontally protruding pin 32 fastened to an arcuate element 33 which is pivoted to the member 28 by a screw 34. An arcuate slot 35 (Fig. 3) in the driving member provided with a clamping screw 36 permits of the radial swinging of the pin 32 to adapt the device 10 to accommodate spools of different diameters. A spring pressed pawl 40 is adapted to engage the ratchet 25 and prevent the sleeve 23 from rotating until the driving member 28 is engaged and rotated by the thread 31 of the shaft 11. The pawl 40 is maintained in operative position by a spiral spring 41 retained in a recessed member 42 which is threaded into the housing or casting 18. A spool 45 having a terminal 46 projecting radially therefrom may be conveniently associated with and is free to be rotated upon the upper extremity of a support 47 which is positioned against the driving member.

In the operation of the above described mechanism a downward movement of the rod 17 causes the segment 15 to move clockwise, thereby rotating the gears 12 and 13 in a counter-clockwise direction. This movement of the gear 12 causes the shaft 11 to rotate clockwise. Since the sleeve 23 is held from rotating by the ratchet 25 and pawl 40, the clockwise rotation of the shaft causes the sleeve and driving member 28 to move outwardly or longitudinally of the shaft 11 until the internal thread 30 of the driving member is moved into engagement with the thread 31 of the shaft 11 and this engagement effects the rotation of the driving member. At this point the sleeve 23 is free to rotate because it has been moved outwardly a sufficient distance for the ratchet 25 to clear the pawl 40, and since the ratchet 24 operatively engages the pawl only on a counter-clockwise rotation of the shaft 11, the pawl rides freely over the peripheral surface of the ratchet 24. The outward or forward movement of the driving member 28 brings the pin 32 into contact with the protruding terminal 46 of the spool 45, as clearly shown in Fig. 4, and causes the desired rotation of the spool.

The raising of the rod 17 causes a counter-clockwise movement of the shaft 11, and the pawl 40 at the same instant engages the ratchet 24 thereby effecting the retraction of the actuating sleeve and driving member and permitting the efficient and easy removal of a spool 45 and the expeditious replacement of another. From the foregoing it will be obvious that the device can be used advantageously in rotating spools to wind a strip of insulating material and the like around the cores thereof.

Although the invention as herein described and illustrated is particularly well adapted for use in connection with the rotation of spools, it should be understood that the novel features are capable of other applications and should be limited only by the scope of the appended claims.

What is claimed is:

1. In a device for rotating an article, a rotary driving means for engaging an article, adjustable means mounted on the driving means for engaging articles of various size, a threaded rotary means supporting the driving means, means for actuating the threaded rotary means, and means for effecting a longitudinal movement of the rotary driving means to engage and for rotating an article and then for disengaging it.

2. In a device for rotating an article, a driving member for engaging an article, a threaded shaft having a projection, a threaded sleeve engaging the threaded shaft and connected to and supporting the driving member, a ratchet and pawl mechanism operatively connected to the sleeve for controlling the movements thereof, and means for rotating the shaft to effect a longitudinal movement of the sleeve to engage the projection on the shaft to rotate the article.

3. In a device for rotating an article, a rotary driving means for engaging an article, a threaded sleeve fastened thereto, means for longitudinally moving the sleeve upon a predetermined condition, article engaging means carried by the driving means adjustable to accommodate articles of various size, a threaded shaft having a projection supporting the sleeve and driving means, and means for rotating the shaft and for effecting longitudinal movement of the driving means to engage the projection on the shaft to rotate the driving means and article.

4. In an apparatus for rotating a spool having a protruding terminal, a spool support, an internally threaded sleeve, a rotary driving member fastened thereto, adjustable means carried by the driving member to engage terminals of spools of various sizes, a threaded shaft supporting the sleeve and driving member, a ratchet connected to the sleeve, a pawl cooperating with the ratchet to effect a longitudinal movement of the driving member, means carried by the shaft for engaging the driving member to effect rotation thereof, and means for rotating the shaft to effect the longitudinal and rotational movement of the driving member to rotate a spool upon the spool support.

5. In a device for rotating an article, an article actuating means, a shaft having double threads, an internally threaded sleeve cooperating therewith and secured to the article actuating means, means for rotating the shaft, and means for effecting a longitudinal movement of the sleeve and the article actuating means in one direction and then in a reverse direction to rotate the article through a predetermined number of revolutions.

6. In a device for rotating an article, a driving member, a threaded shaft, a threaded sleeve cooperating therewith and secured to the driving member, means for rotating the shaft clockwise and counterclockwise, means fixed to the sleeve having oppositely directed ratchet teeth displaced longitudinally of the sleeve, and a pawl with which the teeth are engaged alternately for effecting a longitudinal movement of the driving member relative to the shaft to engage and for rotating an article and then for disengaging it.

In witness whereof, I hereunto subscribe my name this 30th day of September A. D., 1927.

GEORGE LYNDEN ROCK.